United States Patent [19]

Stingelin

[11] Patent Number: 4,873,319
[45] Date of Patent: Oct. 10, 1989

[54] DISAZO DYES CONTAINING A PYRIMIDINE COUPLING COMPONENT AND A CATIONIC ALKYL AMMONIUM GROUP

[75] Inventor: Willy Stingelin, Reinach, Switzerland

[73] Assignee: Ciba-Geigy Corporation, Ardsley, N.Y.

[21] Appl. No.: 100,853

[22] Filed: Sep. 25, 1987

[30] Foreign Application Priority Data

Oct. 3, 1986 [CH] Switzerland .................. 3960/86

[51] Int. Cl.$^4$ .................. C09B 44/02; C09B 44/08; D06P 1/41; D06P 3/58
[52] U.S. Cl. .................. 534/604; 534/573; 534/582; 534/605; 534/887; 564/163
[58] Field of Search .................. 534/604, 605, 606

[56] References Cited

U.S. PATENT DOCUMENTS

| | | | |
|---|---|---|---|
| 2,130,358 | 9/1938 | McNally et al. | 534/756 X |
| 2,216,446 | 10/1940 | McNally et al. | 534/756 X |
| 3,341,512 | 9/1967 | Wegmuller et al. | 534/756 X |
| 3,341,514 | 9/1967 | Entschel et al. | 534/604 |
| 4,062,836 | 12/1977 | Liechti et al. | 534/756 |
| 4,273,707 | 6/1981 | Pedrazzi | 534/638 X |

*Primary Examiner*—Floyd D. Higel
*Attorney, Agent, or Firm*—Edward McC. Roberts

[57] ABSTRACT

Disazo dyes which are suitable for dyeing and printing, especially of paper of all kinds. The dyes correspond to the formula

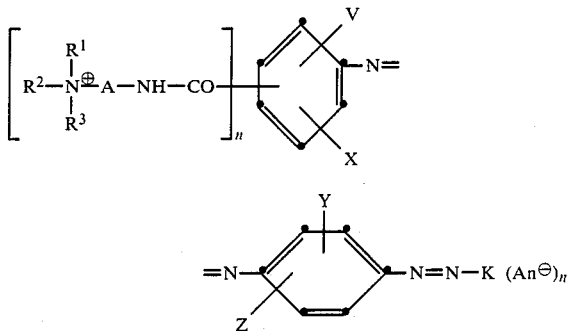

wherein $R^1$, $R^2$ and $R^3$ are each an alkyl radical, A is an alkylene radical, n is 1 or 2, V, X, Y and Z are nonionic substituents customarily in azo dyes, K is a pyrimidine coupling and An is an anion.

15 Claims, No Drawings

DISAZO DYES CONTAINING A PYRIMIDINE COUPLING COMPONENT AND A CATIONIC ALKYL AMMONIUM GROUP

The present invention relates to novel unsulfonated cationic disazo dyes, to their preparation, and to the use thereof as dyes, especially for dyeing textile materials and, most particularly, paper.

The novel disazo dyes have the formula

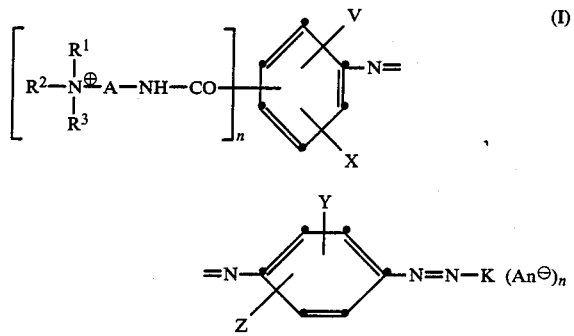

wherein $R^1$, $R^2$ and $R^3$ are each independently an unsubstituted or substituted alkyl radical or $R^1$ and $R^2$, together with the linking nitrogen atom, or $R^1$, $R^2$ and $R^3$, together with the linking nitrogen atom, are a heterocyclic radical, A is a $C_2$-$C_6$alkylene radical, V and X are each independently of the other hydrogen or $C_1$-$C_4$alkyl or $C_1$-$C_4$alkoxy, each unsubstituted or substituted by hydroxy, halogen, cyano or $C_1$-$C_4$alkoxy, Y is hydrogen, $C_1$-$C_4$alkyl or $C_1$-$C_4$alkoxy, halogen or cyano, Z is hydrogen, $C_1$-$C_4$alkyl or $C_1$-$C_4$alkoxy, halogen, cyano, or a group of formula
—NH—CHO,
—NH—CO—NH$_2$,
—NH—CO—NH—Q or
—NH—CO—(O)$_m$—Q,
wherein m is 0 or 1 and Q is unsubstituted or substituted $C_1$-$C_4$alkyl or phenyl, K is a coupling component of formula

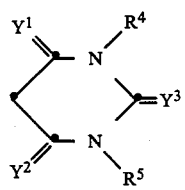

wherein $Y^1$ and $Y^2$ are each independently of the other =O, =NH or =N—$C_1$-$C_4$alkyl, $Y^3$ is =O, =S, =NR or =N—CN, where R is hydrogen or $C_1$-$C_4$alkyl, $R^4$ and $R^5$ are each independently of the other hydrogen, unsubstituted or substituted alkyl or unsubstituted or substituted phenyl, n is 1 or 2, and $An^\ominus$ is an anion.

In the above formula II, only one tautomeric form of the coupling component is shown. However, this formula will be understood as encompassing the other tautomeric forms.

$R^1$, $R^2$ and $R^3$ are each independently an unsubstituted or substituted alkyl radical, for example methyl, ethyl, n-propyl or isopropyl, n-butyl, sec-butyl or tert-butyl, straight chain or branched pentyl or hexyl, cyclopentyl or cyclohexyl, which radicals may be substituted e.g. by hydroxy, phenyl or alkoxy. Examples of such substituted groups are hydroxymethyl, hydroxyethyl, methoxyethyl, ethoxyethyl, propoxypropyl or benzyl.

$R^1$ and $R^2$, together with the linking nitrogen atom, may also be a heterocyclic radical, for example a pyrrolidine, piperidine, morpholine or piperazine radical; or $R^1$, $R^2$ and $R^3$, together with the linking nitrogen atom, are a heterocyclic radical, e.g. a pyridinium or monoquaternised triethylenediamine radical.

Preferably $R^1$ is methyl or hydroxyethyl and $R^2$ and $R^3$ are each independently of the other $C_1$-$C_3$alkyl and are preferably each methyl.

A is a $C_2$-$C_6$alkylene radical, preferably an unbranched radical, e.g. ethylene, propylene, butylene, pentylene or hexylene. The preferred meaning of A is ethylene or butylene and, in particular, propylene.

V and X are each independently of the other hydrogen, $C_1$-$C_4$alkyl or $C_1$-$C_4$alkoxy, each of which lastmentioned groups may be substituted by hydroxy, halogen, e.g. bromine or, preferably, chlorine, or by cyano or $C_1$-$C_4$alkoxy. Preferably V is hydrogen and X is hydrogen, methyl or methoxy.

Y is hydrogen, $C_1$-$C_4$alkyl or $C_1$-$C_4$alkoxy, halogen, e.g. bromine or chlorine, or is cyano. Preferably Y is hydrogen, methyl, methoxy or chlorine.

Z is hydrogen, $C_1$-$C_4$alkyl or $C_1$-$C_4$alkoxy, halogen, e.g. bromine or chlorine, or is cyano or a group of formula
—NH—CHO,
—NH—CO—NH$_2$,
—NH—CO—NHQ or
—NH—CO—(O)$_m$—Q,
wherein m is 0 or 1 and Q is unsubstituted or substituted $C_1$-$C_4$alkyl or phenyl. Suitable substituents of the alkyl groups Q are e.g. halogen such as chlorine or bromine, or, in particular, groups of formulae

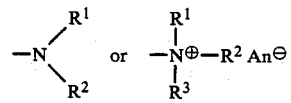

in which $R^1$, $R^2$ and $R^3$ are as defined above and $An^\ominus$ is an anion. Examples of suitable substituents of the phenyl group Q are: $C_1$-$C_4$alkyl, $C_1$-$C_4$alkoxy, halogen or nitro.

Preferably Z is methyl, ethyl, methoxy, ethoxy, acetylamino, propionylamino, methoxycarbonylamino, ethoxycarbonylamino or a group of formula —NH—CHO, —NH—CO—NH$_2$,

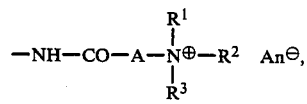

—NH—CO—$R^2$ or

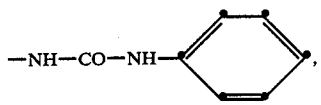

wherein A is ethylene, propylene or butylene, $R^1$ is methyl or hydroxyethyl, and $R^2$ and $R^3$ are each independently of the other $C_1$-$C_3$alkyl.

In the definition of the coupling component K of formula II above, $R^4$ and $R^5$ are each independently of the other hydrogen, unsubstituted or substituted alkyl or unsubstituted or substituted phenyl.

$R^4$ and $R^5$ as unsubstituted or substituted alkyl are e.g. a methyl, ethyl, n-propyl or isopropyl, n-butyl, sec-butyl or tert-butyl radical, or a straight chain or branched pentyl or hexyl radical or a cyclohexyl radical, which radicals may be substituted, e.g. by one or more members selected from the group consisting of —OH, $C_1$-$C_4$alkoxy and $C_1$-$C_4$hydroxyalkoxy.

Typical examples of suitable substituted alkyl radicals are: methoxymethyl, ethoxymethyl, ethoxyethyl, ethoxypropyl, n-propoxymethyl, isopropoxymethyl, butoxymethyl, butoxyethyl, butoxypropyl, ethoxypentyl, methoxybutyl, ethoxypentyl and 2-hydroxyethoxypentyl.

$R^4$ and $R^5$ as phenyl or substituted phenyl may be: unsubstituted phenyl or phenyl which is substituted by one or more identical or different radicals. Examples of such radicals are: $C_1$-$C_4$alkyl, e.g. methyl, ethyl, n-propyl or isopropyl, or n-butyl, sec-butyl or tert-butyl; $C_1$-$C_4$alkoxy, which throughout this specification will generally be understood as comprising methoxy, ethoxy, n-propoxy or isopropoxy, or n-butoxy, sec-butoxy or tert-butoxy; and halogen such as fluorine, chlorine or bromine; and nitro.

Preferably $R^4$ and $R^5$ as phenyl are phenyl which is substituted by 1 to 3 identical or different members of the group consisting of $C_1$-$C_4$alkyl, chlorine and methoxy; but the preferred meaning is unsubstituted phenyl.

$R^4$ and $R^5$ are preferably hydrogen or $C_1$-$C_4$alkyl, most preferably hydrogen or methyl.

$Y^1$ and $Y^2$ are preferably the functional group =O or =NH and it is also preferred that $Y^1$ and $Y^2$ are identical. Most preferably $Y^1$ and $Y^2$ are identical and are each =O.

$Y^3$ is preferably the group =O, =S, =NH or =N—CN. Most preferably, $Y^3$ is the group =O.

In a particularly preferred embodiment of the azo dyes of this invention, $Y^1$, $Y^2$ and $Y^3$ are each =O.

Possible anions An$^\ominus$ are inorganic as well as organic anions, e.g.: a halide anion such as the chloride, bromide or iodide anion; the sulfate, methyl sulfate, boron tetrafluoride, aminosulfonate, perchlorate, carbonate, bicarbonate, phosphate, phosphoromolybdate, phosphorotungstate, phosphorotungstomolybdate, benzenesulfonate, naphthalenesulfonate, 4-chlorobenzenesulfonate, oxalate, maleate, acetate, propionate, lactate, succinate, chloroacetate, tartrate, methanesulfonate or benzoate ion; or a complex anion such as the anion of chlorozinc double salts.

The anion is normally predetermined by the preparatory process. Preferably the anion is present as chloride, hydrogen sulfate, sulfate, methosulfate, phosphate, formate, lactate or acetate. It can be exchanged in known manner for another anion.

A preferred embodiment of the present invention relates to azo dyes of formula I, wherein $R^1$ is methyl or hydroxyethyl, $R^2$ and $R^3$ are each independently of the other $C_1$-$C_3$alkyl, A is ethylene, propylene or butylene, V is hydrogen, X is hydrogen, methyl or methoxy, Y is hydrogen, methyl, methoxy or chlorine, Z is methyl, methoxy, ethyl, ethoxy, acetylamino, propionylamino, methoxycarbonylamino, ethoxycarbonylamino or a group of formula

—NH—CHO,

—NH—CO—NH$_2$,

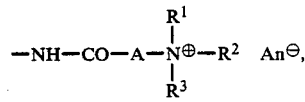

—NH—CO—$R^2$ or

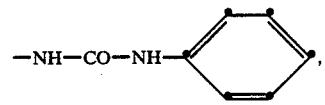

K is a coupling component of formula

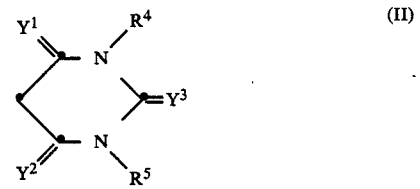

(II)

wherein $Y^1$ and $Y^2$ are each independently of the other =O or =NH, $Y^3$ is =O, =S, =NH or =N—CN, $R^4$ and $R^5$ are each independently of the other hydrogen or $C_1$-$C_4$alkyl, n is 1 or 2, and An$^\ominus$ is an anion.

Among these compounds, those azo dyes are preferred in which $R^1$, $R^2$ and $R^3$ are each methyl, A is propylene, V and X are each hydrogen, $Y^3$ is =O, $R^4$ and $R^5$ are each hydrogen or methyl, and the other symbols are as defined above.

The disazo dyes of formula I are prepared in a manner which is known per se, for example by diazotising an amine of formula

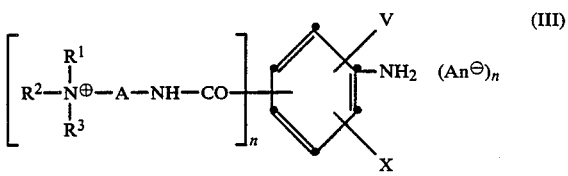

(III)

then reacting the diazo compound so obtained with a coupling component of formula

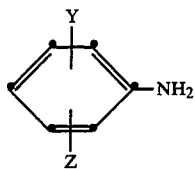

diazotising the aminoazo compound so obtained and reacting the diazotised aminoazo compound with a coupling component of formula

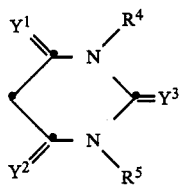

in which formulae above $R^1$, $R^2$, $R^3$, A, V, X, Y, Z, $Y^1$, $Y^2$, $Y^3$, $R^4$, $R^5$, n and $An^\ominus$ have the meanings and preferred meanings given above.

The compounds of formulae II, III and IV are known or can be obtained in known manner.

The azo compounds of formula I are used as powder or granular formulations as well as in the form of concentrated solutions. Powder formulations are standardised in conventional manner with extenders such as sodium sulfate, sodium phosphate, sodium chloride or sodium acetate, in the presence of dust inhibitors, or the azo compounds are marketed direct as spray dried formulations. Concentrated dye solutions may be of aqueous or aqueous-organic nature, in which case customary and preferably readily degradable auxiliaries are preferred, for example organic acids, preferably acetic acid, formic acid, lactic acid or citric acid, amides such as formamide or dimethylformamide, urea, alcohols such as glycol, diglycol or diglycol ethers, preferably methyl or ethyl ethers.

The azo compounds of formula I are used in particular as dyes for dyeing and printing textile materials, paper, leather, and for preparing inks. Suitable textile materials are cationically dyeable natural and synthetic materials. The novel azo compounds are preferably used for dyeing and printing paper, semi-cardboards and cardboard in the pulp and on the surface, as well as for dyeing textile materials consisting preferably e.g. of homopolymers or copolymers of acrylonitrile or of synthetic polyamides or polyesters which are modified by acid groups. These textile materials are preferably dyed in aqueous, neutral or acid medium by the exhaust process, under normal or elevated pressure, or by the continuous dyeing process. The textile material can be in any form of presentation, for example fibres, filaments, wovens, knits, piece goods and finished goods such as shirts or pullovers.

Level dyeings and prints which are distinguished by very good fastness properties, especially a very high degree of exhaustion and good fastness to water, are obtained with the dyes of this invention.

The novel azo compounds of formula I can also be used for dyeing and printing natural and regenerated cellulosic materials, especially cotton and viscose, on which dyeings of good tinctorial strength are likewise obtained.

The novel azo compounds of formula I have good affinity for these textile materials, a good degree of exhaustion, and the dyeings obtained have very good fastness properties, in particular good wetfastness properties.

A preferred utility of the novel azo compounds of formula I is that of dyeing paper of all kinds, especially bleached or unbleached lignin-free paper, which comprises starting from bleached or unbleached pulp, using hardwood or softwood kraft pulp such as birchwood sulfite or kraft pulp or pine sulfite or kraft pulp. These compounds are most especially suitable for dyeing unsized paper (e.g. napkins, tablecloths, hygienic papers) on account of their very high affinity for this substrate.

The novel azo compounds of formula I exhaust very well on to these substrates, so that the wastewaters remain virtually colourless.

Dyeings in yellow, yellowish orange or red shades are obtained.

The resultant dyeings are distinguished by good general fastness properties such as good lightfastness with concomitant excellent clarity and tinctorial strength and wetfastness, i.e. they exhibit no tendency to bleed when dyed paper in the wet state is brought into contact with wet white paper. In addition they have good fastness to alum, acid and alkali. The wetfastness relates not only to water, but also to milk, fruit juice and sweetened mineral water. Owing to their good fastness to alkali, the dyeings are also resistant to alcoholic beverages. This property is especially desirable e.g. for napkins and tablecloths of which it may be expected that the dyed paper in the wet state (e.g. impregnated with water, alcohol, surfactant solution and the like) will come into contact with other substrates such as textiles, paper and the like, which have to be protected against soiling.

The excellent affinity for paper and the high rate of exhaustion of the novel dyes is very advantageous for the continuous dyeing of paper.

The following Examples illustrate the invention, but imply no limitation to what is described therein. Unless otherwise indicated, parts are by weight.

The abbreviation RKN is a quality description and indicates the degree of purity of the cellulose; the abbreviation SR (Schopper-Riegler) indicates freeness.

EXAMPLE 1

(A) 95.1 parts of dimethylaminopropylamine are added dropwise over 15 minutes to a solution of 84 parts of p-nitrobenzoyl chloride in 260 parts of toluene. The ensuing reaction is exothermic and the temperature rises to 95° C. After the temperature has fallen to 30° C., 200 parts of water are added, the batch is cooled to 10° C. and the precipitated product is filtered with suction. The filter cake is washed with water until free of salt and dried at 60° C. under vacuum. For quaternisation, the product is stirred in 960 parts of toluene and then 47.8 parts of dimethyl sulfate are added dropwise. The temperature rises to 50° C. in the course of the ensuing exothermic reaction. The temperature is then raised to 75° C. and kept for 8 hours. After cooling to room temperature, the white quaternised product is collected by suction filtration, washed with toluene and vacuum dried at 60° C. For hydrogenation, the product is suspended in 320 parts of methanol in the presence of palladium on carbon and hydrogenated with hydrogen. Upon completion of the reduction, the catalyst is removed by suction filtration and the methanol is distilled off under vacuum. The resinous residue has the formula

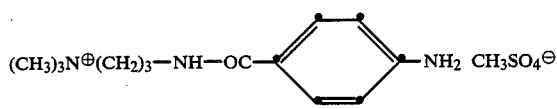

(B) 7.7 parts of the compound prepared according to (A) are dissolved in 35 parts of water, then 30 parts of ice and 7 parts of 32% hydrochloric acid are added and diazotisation is effected at 0°–5° C. with 20.8 parts of 1N sodium nitrite solution. Then 2.4 parts of 2,5-dimethylaniline are dissolved in 42 parts of 3.5% hydrochloric acid and the solution is added dropwise to the diazo solution. The coupling mixture is adjusted to pH 3.5–4 by strewing in crystalline sodium acetate. As soon as no more diazo solution can be detected, sodium chloride is added to the suspension until a spot test exhibits virtually no bleeding. The precipitate is then isolated by filtration and washed with saline solution. The monoazo dye so obtained is suspended in 200 parts of water, then 7 parts of 32% hydrochloric acid are added and diazotisation is effected at 0°–5° C. with 19.2 parts of 1N sodium nitrite solution. The diazo solution is added at 0°–10° C. to a solution of 2.4 parts of barbituric acid in 100 parts of water and 15 parts of 30% sodium hydroxide solution while keeping the pH at 6–7 by addition of sodium hydroxide solution. The batch is stirred for 4 hours, then 160 parts of ethanol are added, stirring is continued for another 2 hours and the precipitated dye is filtered with suction, washed with ethanol and then with acetone, and vacuum dried at 60° C. The dye of formula

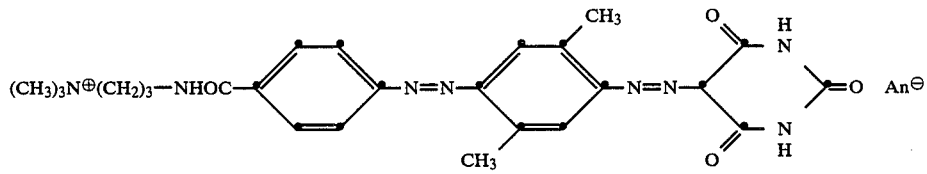

An⊖: mixture of Cl⊖ and CH₃OSO₃⊖ is obtained in the form of a powder which is soluble in dilute formic acid and dyes paper in yellowish orange shades of good light- and wetfastness.

EXAMPLE 2

The procedure described in Example 1(A) is repeated, replacing p-nitrobenzoyl chloride by the same amount of m-nitrobenzoyl chloride, to give the compound of formula

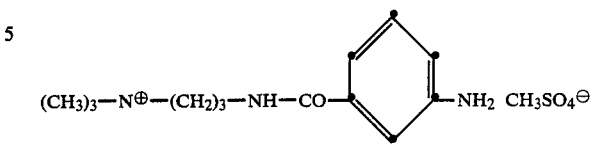

The procedure of Example 1(B) is repeated, using 7 parts of this compound, to give the dye of formula

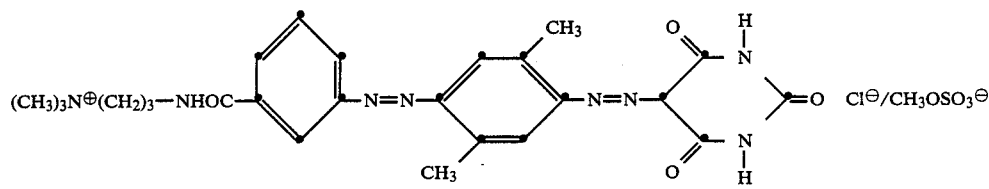

in powder form. This dye is soluble in dilute formic acid and dyes paper in yellowish orange shades of good light- and wetfastness.

EXAMPLE 3

(A) 65.7 parts of diethylaminopropylamine are added dropwise over 15 minutes to a solution of 47 parts of p-nitrobenzoyl chloride in 174 parts of toluene. The ensuing reaction is exothermic and the temperature rises to 90° C. After the temperature has fallen to 35° C., 100 parts of water are added and the mixture is stirred. After waiting for phase separation, the organic phase is washed with water, dried, and concentrated by evaporation. The residue is dissolved in 87 parts of toluene and subsequently quaternisation is effected as described in Example 1(A) by the dropwise addition of 42 parts of dimethyl sulfate, followed by hydrogenation and working up to give the compound of formula

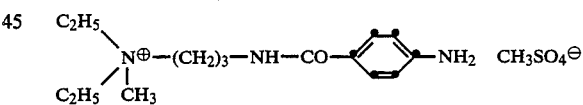

The procedure described in Example 1(B) is repeated, using 8.3 parts of this compound, to give the dye of formula

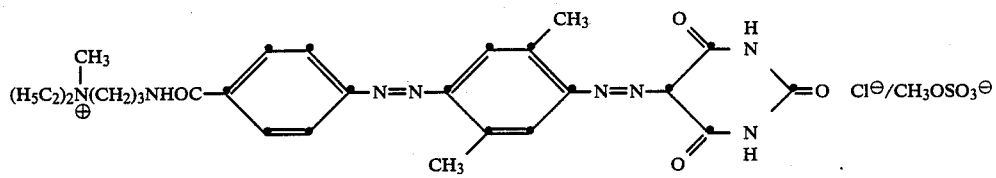

which is obtained in powder form. The dye is soluble in dilute formic acid and dyes paper in yellowish orange shades of good light- and wetfastness.

EXAMPLE 4

49.6 parts of 5-nitroisophthaloyl dichloride are dissolved in 180 parts of toluene and the solution is added dropwise to a solution of 42.9 parts of dimethylaminopropylmine in 80 parts of toluene, whereupon the temperature rises to 70° C. When the dropwise addition is complete, the temperature is raised to 100° C. and kept for 6 hours. After cooling to room temperature, the solvent is removed by decantation and the residue is dissolved in 100 parts of water and the pH of the solution is adjusted to 12 with sodium hydroxide solution. The solution is extracted with ethyl acetate and the extract is washed with saline solution and concentrated by evaporation. The resultant yellow oil is dissolved in 90 parts of water, then 44.8 parts of dimethyl sulfate are added dropwise at 20°–25° C. over c. 45 minutes, while simultaneously keeping the pH in the range from 10–11 by addition of 4N sodium hydroxide solution. The batch is stirred for 4 hours at this pH. The solution is then diluted with 325 parts of ethanol and 260 parts of water and hydrogenated over palladium on carbon. Upon completion of the reaction, the catalyst is removed by suction filtration and the solution is concentrated by evaporation under vacuum, to give the compound of formula

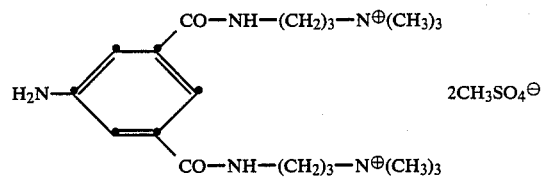

10.8 parts of this compound are dissolved in 45 parts of water and working up is effected as described in Example 1(B), to give the dye of formula

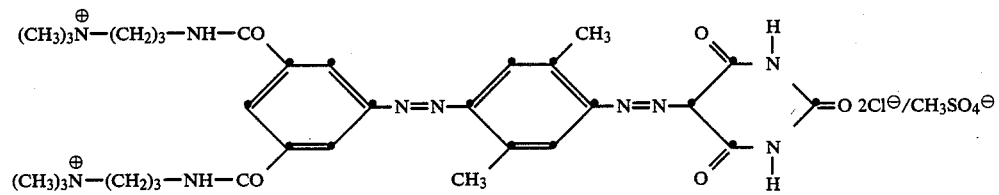

which is obtained in powder form. The dye is soluble in water or dilute acids and dyes paper in yellowish orange shades of good light- and wetfastness.

EXAMPLES 5–12

The procedure described in Example 1 is repeated, using equivalent amounts of the aniline derivatives listed in column 2 and the coupling components listed in column 3 of the following table, to give dyes of formula

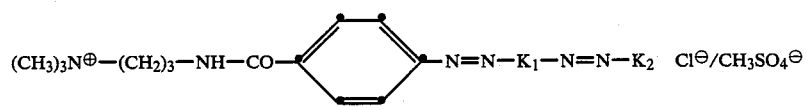

which dye paper in the shades of good fastness properties indicated in column 4.

| Ex. | $K_1$ | $K_2$ | Shade on paper |
|---|---|---|---|
| 5 | ![structure with CH3 groups on benzene] | ![structure with CH3, N-CH3, O groups] | golden yellow |

-continued

| Ex. | K₁ | K₂ | Shade on paper |
|---|---|---|---|
| 6 | 2,5-substituted benzene: OCH₃ (top), CH₃ (bottom) | barbituric acid (NH-CO-NH with C=O) | orange |
| 7 | 2,5-substituted benzene: OCH₃, CH₃ | N,N'-dimethyl barbituric acid | orange |
| 8 | 2,5-substituted benzene: OCH₃, OCH₃ | barbituric acid | red |
| 9 | 2,5-substituted benzene: CH₃, CH₃ | barbituric acid with =N—CN | golden yellow |
| 10 | 2,5-substituted benzene: CH₃, CH₃ | 2-thiobarbituric acid (=S) | orange |
| 11 | 4-substituted benzene: CH₃ | barbituric acid | yellow |
| 12 | 4-substituted benzene: NHCOOC₂H₅ | barbituric acid | golden yellow |

EXAMPLES 13–19

The procedure described in Example 4 is repeated, using equivalent amounts of the aniline derivatives listed in column 2 and the coupling components listed in column 3 of the following table, to give dyes of formula

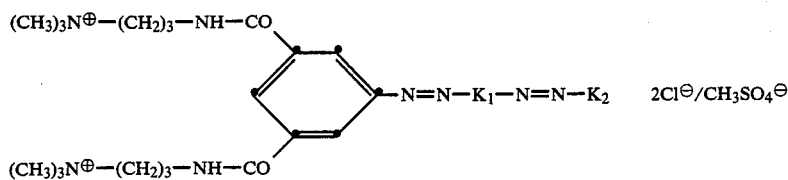

which dye paper in the shades of good fastness properties indicated in column 4.

| Ex | K₁ | K₂ | Shade on paper |
|----|----|----|----------------|
| 13 | 2,5-dimethylphenyl | barbituric acid N,N'-dimethyl | yellow |
| 14 | 2,5-dimethylphenyl | barbituric acid with =N—CN | orange |
| 15 | 2-methoxy-5-methylphenyl | barbituric acid | orange |
| 16 | 2-methoxy-5-methylphenyl | barbituric acid N,N'-dimethyl | orange |
| 17 | 2,5-dimethylphenyl | diaminopyrimidine | orange |
| 18 | 3-methylphenyl | barbituric acid | yellow |

| Ex | K₁ | K₂ | Shade on paper |
|---|---|---|---|
| 19 | 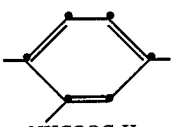 | 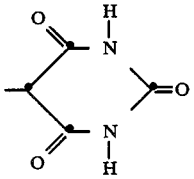 | yellow |

EXAMPLES 20-23

The procedure described in Example 3 is repeated, using equivalent amounts of the aniline derivatives listed in column 2 and the coupling components listed in column 3 of the following table, to give dyes of formula

which dye paper in the shades of good fastness properties indicated in column 4.

| Ex. | K₁ | K₂ | Shade on paper |
|---|---|---|---|
| 20 | 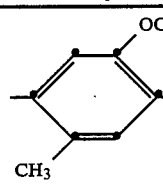 | 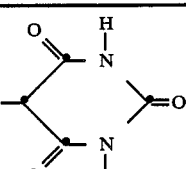 | orange |
| 21 | 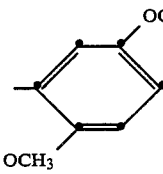 | 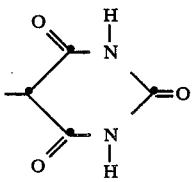 | red |
| 22 | 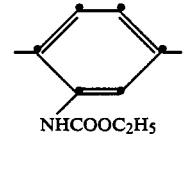 | 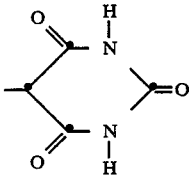 | red |
| 23 | 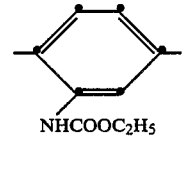 | 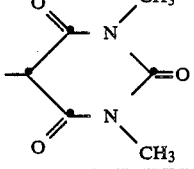 | red |

EXAMPLE 24

50 parts of chemically bleached beech sulfite are mixed with 50 parts of bleached RKN 15 (SR freeness 22°) and 2 parts of the dye of Example 1 in water (pH 6, waterhardness 10° dH), temperature 20° C., goods to liquor ratio 1:40). After stirring for 15 minutes, paper sheets are produced on a Frank sheet former.

The paper is dyed in a very deep golden yellow shade. The wastewater is virtually colourless. The degree of exhaustion is almost 100%. The light- and wetfastness properties are excellent.

EXAMPLE 25

A paper web of bleached beech sulfite (22° SR) is prepared on a continuously operating laboratory paper machine. Ten seconds before the stock preparation, an aqueous solution of the dye of Example 1 is added continuously to the dilute pulp with vigorous turbulence (0.5% colouration, goods to liquor ratio 1:400, water hardness 10° dH, pH 6, temperature 20° C.).

The paper web is coloured in a strong orange shade of average intensity. The wastewater is completely colourless.

EXAMPLE 26

10 parts of cotton fabric (bleached mercerised cotton) are dyed in a laboratory beam dyeing machine in 200 parts of a liquor (water hardness 10° dH, pH 4, 3 circulations of the liquor per minute) which contains 0.05 part of the dye Example 1. The temperature is raised in the course of 60 minutes to 20°–100° C., then kept constant for 15 minutes.

The dyebath is completely exhausted and the cotton fabric is dyed in a strong orange shade of good lightfastness and very good wetfastness.

If textile fabric of regenerated cellulose (viscose) is dyed by the same procedure, the dye of Example 1 gives on this material a strong yellowish orange dyeing of good lightfastness and very good wetfastness properties.

What is claimed is:

1. An unsulfonated cationic disazo dye of formula

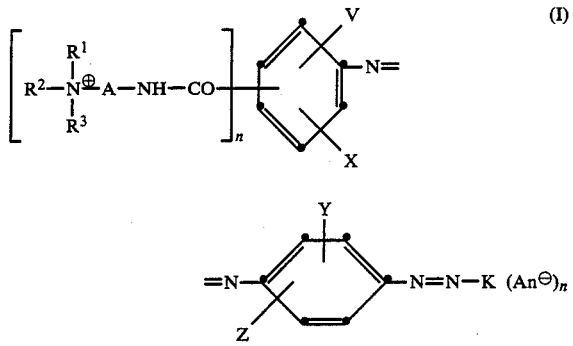

wherein $R^1$, $R^2$ and $R^3$ are each independently an unsubstituted alkyl radical or an alkyl radical which is substituted by hydroxy, phenyl or alkoxy, or $R^1$ and $R^2$, together with the linking nitrogen atom are a pyrrolidine, piperidine, morpholine or piperazine radical, or $R^1$, $R^2$ and $R^3$, together with the linking nitrogen atom, are a pyridinium or triethylenediamine radical, A is a $C_2$–$C_6$alkylene radical, V and X are each independently of the other hydrogen or $C_1$–$C_4$alkyl or $C_1$–$C_4$alkoxy, each unsubstituted or substituted by hydroxy, halogen, cyano or $C_1$–$C_4$alkoxy, Y is hydrogen, $C_1$–$C_4$alkyl or $C_1$–$C_4$alkoxy, halogen, or cyano, Z is hydrogen, $C_1$–$C_4$alkyl or $C_1$–$C_4$alkoxy, halogen, cyano, or a group of formula —NH—CHO,
—NH—CO—NH$_2$,
—NH—CO—NH—Q or
—NH—CO—(O)$_m$—Q, wherein m is 0 or 1 and Q is $C_1$–$C_4$alkyl which is unsubstituted or substituted by halogen or groups of the formulae

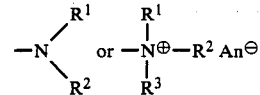

or Q is phenyl which is unsubstituted or substituted by $C_1$–$C_4$alkyl, $C_1$–$C_4$alkoxy, halogen or nitro, K is a coupling component of formula

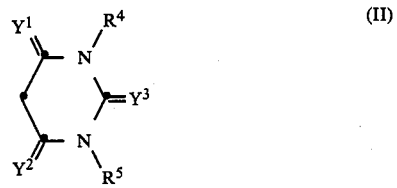

wherein $Y^1$ and $Y^2$ are each independently of the other =O, =NH, or =N—$C_1$–$C_4$alkyl, $Y^3$ is =O, =S, =NR or =N—CN, where R is hydrogen or $C_1$–$C_4$alkyl, $R^4$ and $R^5$ are each independently of the other hydrogen, alkyl which is unsubstituted or substituted by hydroxy, $C_1$–$C_4$alkoxy or $C_1$–$C_4$hydroxyalkoxy or they are phenyl which is unsubstituted or substituted by $C_1$–$C_4$alkyl, $C_1$–$C_4$alkoxy, halogen or nitro, n is 1 or 2, and An$^\ominus$ is an anion.

2. A disazo dye according to claim 1, wherein $R^1$, $R^2$ and $R^3$ are each independently methyl, ethyl, n-propyl or isopropyl, n-butyl, sec-butyl or tert-butyl, straight chain or branched pentyl or hexyl, cyclopentyl or cyclohexyl, which radicals are unsubstituted or substituted by hydroxy, phenyl or alkoxy, or wherein $R^1$ and $R^2$, together with the linking nitrogen atom are a pyrrolidine, piperidine, morpholine or piperazine radical, or wherein $R^1$, $R^2$ and $R^3$, together with the linking nitrogen atom, are a pyridinium or monoquaternised triethylenediamine radical.

3. A disazo dye according to claim 2, wherein $R^1$ is methyl or hydroxyethyl, and $R^2$ and $R^3$ are each independently of the other $C_1$–$C_3$alkyl.

4. A disazo dye according to claim 1, wherein V is hydrogen.

5. A disazo dye according to claim 1, wherein X is hydrogen, methyl or methoxy.

6. A disazo dye according to claim 1, wherein Y is hydrogen, methyl, methoxy or chlorine.

7. A disazo dye according to claim 1, wherein Z is methyl, ethyl, ethoxy, acetylamino, propionylamino, methoxycarbonylamino, ethoxycarbonylamino or a group of formula —NH—CHO, —NH—CO—NH$_2$,

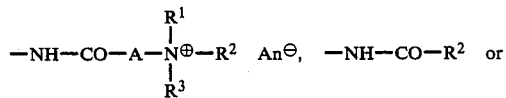

, wherein A is ethylene, propylene or butylene, $R^1$ is methyl or hydroxyethyl, and $R^2$ and $R^3$ are each independently of the other $C_1$–$C_3$alkyl.

8. A disazo dye according to claim 1, wherein $R^4$ and $R^5$ are each independently of the other methyl, ethyl, n-propyl or isopropyl, n-butyl, sec-butyl or tert-butyl radical, or a straight chain or branched pentyl or hexyl radical or a cyclohexyl radical, which radicals may be substituted by —OH, $C_1$–$C_4$alkoxy or $C_1$–$C_4$hydroxyalkoxy, or is a phenyl radical which is unsubstituted or substituted by $C_1$–$C_4$alkyl or $C_1$–$C_4$alkoxy, chlorine, bromine or nitro.

9. A disazo dye according to claim 8, wherein $R^4$ and $R^5$ are each independently of the other hydrogen or $C_1$–$C_4$alkyl.

10. A disazo dye according to claim 1, wherein $Y^1$ and $Y^2$ are each independently of the other =O or =NH.

11. A disazo dye according to claim 10, wherein $Y^1$ and $Y^2$ are identical.

12. A disazo dye according to claim 11, wherein $Y^1$ and $Y^2$ are each =O.

13. A disazo dye according to claim 1, wherein $Y^3$ is =O, =S, =NH or =NH—CN, preferably =O.

14. A disazo dye according to claim 1, wherein
 $R^1$ is methyl or hydroxyethyl,
 $R^2$ and $R^3$ are each independently of the other $C_1$–$C_3$alkyl,
 A is ethylene, propylene or butylene,
 V is hydrogen,
 X is hydrogen, methyl or methoxy,
 Y is hydrogen, methyl, methoxy or chlorine,
 Z is methyl, methoxy, ethyl, ethoxy, acetylamino, propionylamino, methoxycarbonylamino, ethoxycarbonylamino or a group of formula
 —NH—CHO,
 —NH—CO—NH$_2$,

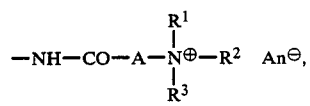

—NH—CO—R$^2$ or

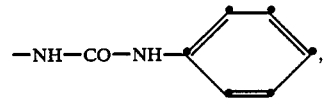

K is a coupling component of formula

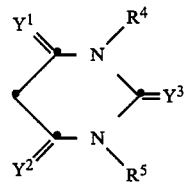

(II)

wherein
$Y^1$ and $Y^2$ are each independently of the other =O or =NH,
$Y^3$ is =O, =S, =NH or =N—CN,
$R^4$ and $R^5$ are each independently of the other hydrogen or $C_1$–$C_4$alkyl,
n is 1 or 2, and
An$^\ominus$ is an anion.

15. A disazo dye according to claim 14, wherein $R^1$, $R^2$ and $R^3$ are each methyl, A is propylene, V and X are each hydrogen, $Y^3$ is =O, and $R^4$ and $R^5$ are each hydrogen or methyl.

* * * * *